R. G. FURLEY.
APPARATUS FOR DRYING WASHED BIRDS, DOGS, AND OTHER ANIMALS.
APPLICATION FILED MAY 13, 1913.
1,096,708.
Patented May 12, 1914.
2 SHEETS—SHEET 1.
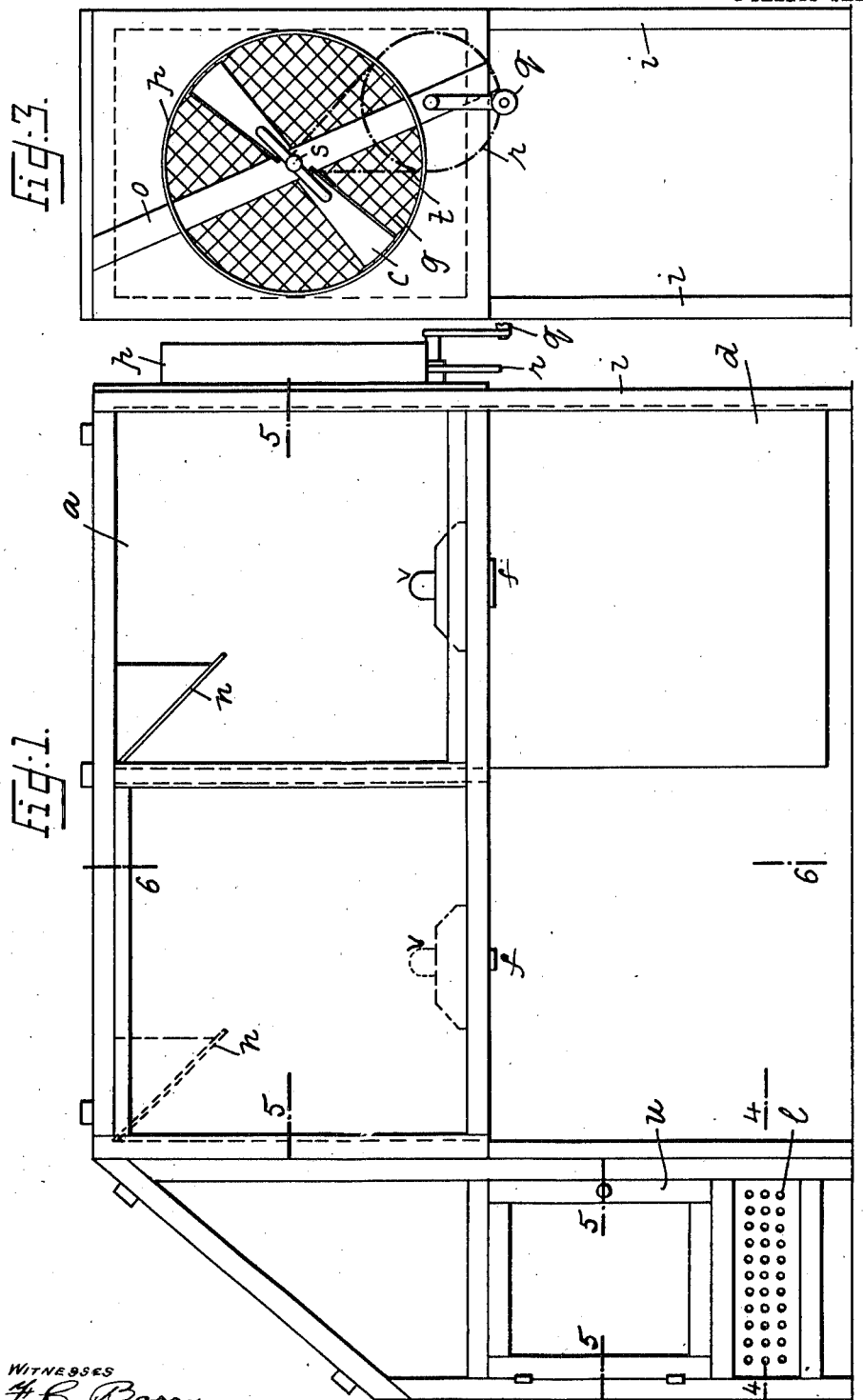
WITNESSES
INVENTOR
ROBERT GWYNNE FURLEY.
BY Munn & Co.
ATTORNEYS R. G. FURLEY.
APPARATUS FOR DRYING WASHED BIRDS, DOGS, AND OTHER ANIMALS.
APPLICATION FILED MAY 13, 1913.
1,096,708.
Patented May 12, 1914.
2 SHEETS—SHEET 2.
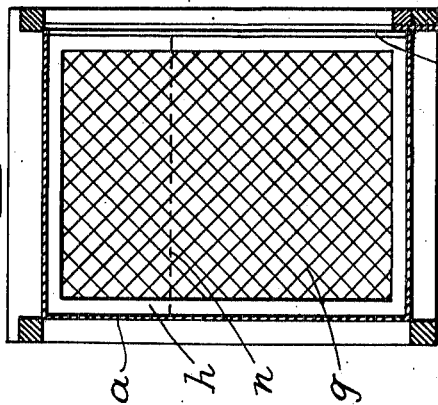
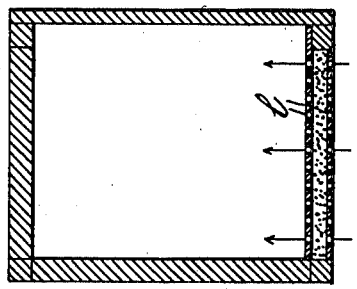
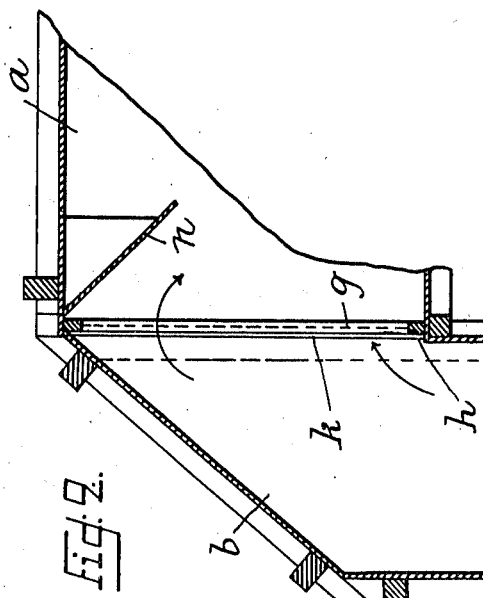
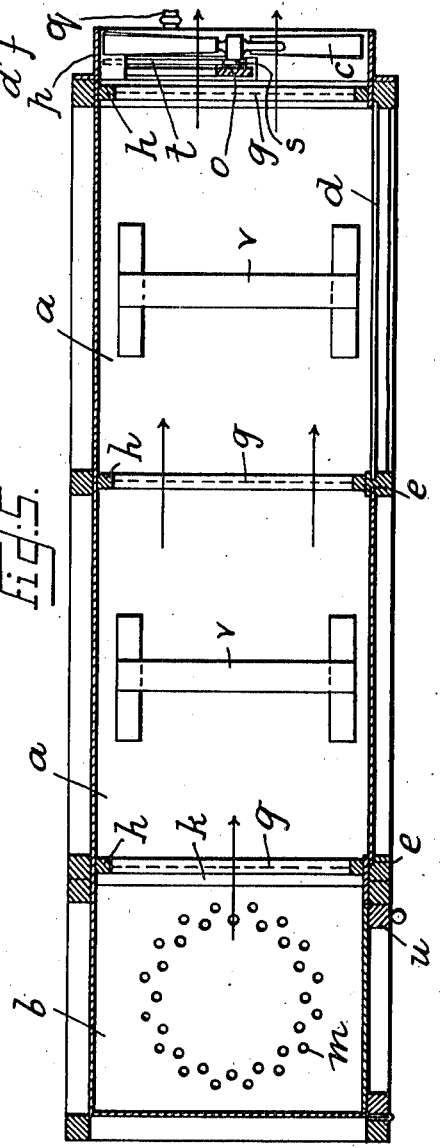
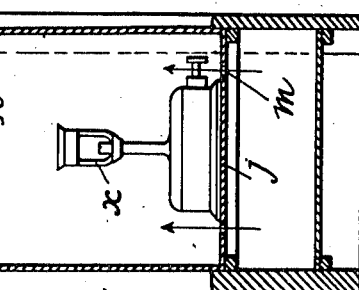
WITNESSES
INVENTOR
ROBERT GWYNNE FURLEY
BY
ATTORNEYS

UNITED STATES PATENT OFFICE.

ROBERT GWYNNE FURLEY, OF NEWLAND, ENGLAND.

APPARATUS FOR DRYING WASHED BIRDS, DOGS, AND OTHER ANIMALS.

1,096,708. Specification of Letters Patent. Patented May 12, 1914.

Application filed May 13, 1913. Serial No. 767,274.

*To all whom it may concern:*

Be it known that I, ROBERT GWYNNE FURLEY, a subject of the King of Great Britain and Ireland, and a resident of Newland, Coleford, Gloucester, England, have invented certain new and useful Apparatus for Drying Washed Birds, Dogs, and other Animals; and I do hereby declare the following to be a full, clear, and exact description of the same.

This invention relates to apparatus for drying washed birds, dogs and other animals (hereinafter referred to as "animals") particularly when intended for show purposes, in a quick and efficient manner without inconvenience or detriment thereto.

The invention comprises an animal drying chamber open at each end, perforated or reticulated screens at said ends and intermediate of said ends dividing the drying chamber into compartments, an air heating chamber communicating with one end of the drying chamber, an air extractor at the other end of the drying chamber, and means permitting access to the interiors of the chambers.

In the operation of the apparatus, the animals are placed in the compartments of the drying chamber, and the air extractor is driven so that fresh air is drawn into the air heating chamber and from thence successively through the compartments of the drying chamber, whereby the animals are speedily and conveniently dried.

The invention is illustrated in the accompanying drawings, in which:—

Figure 1 is a front longitudinal elevation of the apparatus; Fig. 2 is a part longitudinal sectional elevation; Fig. 3 is an end elevation; Fig. 4 is a sectional plan on 4—4, Fig. 1; Fig. 5 is a sectional plan on 5—5, Fig. 1; Fig. 6 is a transverse sectional elevation on 6—6, Fig. 1.

In the construction represented, $a$, is an animal drying chamber; $b$ is an air heating chamber, in which an oil burner or other heating device, $x$, is placed; and $c$ is an air extractor. The drying chamber is closed at the roof, base and back, and is fitted with doors, $d$, adapted to slide vertically in guides, $e$, at the front. The doors, $d$, may be held up by turn-buttons or the like, $f$, as shown on the left, Fig. 1, or may depend as shown on the right, Fig. 1.

$g$ are wire screens on frames, $h$, situate at the ends of the drying chamber and intermediate of the ends for dividing the chamber into compartments to keep the animals isolated and from contact with the heating device and the air extractor. The doors permit independent access to the interiors of the respective compartments.

The drying chamber is supported at one end by the air heating chamber, $b$, and at the other end by legs, $i$. The air heating chamber is deeper than the drying chambers so that the heating device, $x$, which rests on a support, $j$, is situate below the level of the drying chamber. The air heating chamber communicates with the drying chamber through an opening, $k$, at the upper part of the air heating chamber, and is formed with cold air inlets, $l, m$, at its lower part. The inlets, $l$, may be formed in a double screen between the walls of which is a filtering layer of hygroscopic material such as calcium oxid to dry the air before it is drawn into the hot air chamber through the inlets, $m$, as shown in Fig. 4.

The roof of the hot air chamber is inclined as shown in Fig. 2, to direct the hot air into the drying chamber, and inclined dependent baffles, $n$, are arranged in the upper parts of the drying chamber to deflect the air downward onto the animals. The baffles may be adjustable in inclination.

The air extractor is mounted on a cross stay, $o$, and is protected by, a guard, $p$. The air extractor is geared up from a driving handle, $q$, or other driving agent by sprocket wheels, $r, s$, and a chain $t$. The air extractor is of such dimensions as to insure a current of dry warm air passing all around the animals.

$u$ is a door for facilitating access to the heating device.

$v$ represents perches on which birds may stand.

The air heating chamber and the animal drying chamber are preferably constructed of fire resisting material, such as sheet asbestos, mounted on a suitable framework. Although a drying chamber for two animals is shown in the drawings, it may be constructed to accommodate any desired number of animals.

What I claim as my invention and desire to secure by Letters Patent is:—

1. Apparatus for drying washed birds, dogs and other animals comprising a drying chamber open at the ends, reticulated screens at said ends, guides at the front of the chamber, doors adapted to slide in the guides and to open by moving vertically downward, an air heating chamber of greater depth than and communicating at its upper part with one end of the drying chamber, and an air extractor at the other end of the drying chamber, substantially as described.

2. Apparatus for drying washed birds, dogs and other animals comprising a drying chamber open at the ends, reticulated screens at said ends and intermediate of said ends forming the chamber into a series of successive compartments, vertical guides at the front of the compartments, doors adapted to slide in the guides for permitting access to said compartments, an air heating chamber communicating at its upper part with one end of the drying chamber and communicating at its lower part and below the level of the drying chamber with the atmosphere, and an air extractor at the other end of the drying chamber for drawing the heated air through the series of compartments, substantially as described.

3. Apparatus for drying washed birds, dogs and other animals comprising a drying chamber open at the ends, reticulated screens at said ends, an air extractor at one end of the chamber for drawing air thereinto and therethrough, and an inclined deflector at the upper part of the chamber for directing the entering air in a downward direction within the chamber, substantially as described.

4. Apparatus for drying washed birds, dogs and other animals comprising a drying chamber open at the ends, reticulated screens at said ends, an air extractor at one end of the chamber for drawing air thereinto and therethrough, and an inclined adjustable deflector at the upper part of the chamber for directing the entering air in a downward direction within the chamber, substantially as described.

5. Apparatus for drying washed birds, dogs and other animals comprising a drying chamber open at the ends, reticulated screens at said ends, an air heating chamber communicating with one end of the drying chamber, said air heating chamber having an inclined roof for directing the heated air into the drying chamber, and an inclined deflector at the upper part of the drying chamber for directing the entering heated air downward, and means for inducing an air current through the chambers, substantially as described.

6. Apparatus for drying washed birds, dogs and other animals comprising a drying chamber open at the ends, reticulated screens at said ends, an air heating chamber communicating with one end of the drying chamber and having air inlets at its lower part, a hygroscopic filter covering said inlets, a fuel burner for inducing an upward current of air through the air heating chamber, an inclined roof to said air heating chamber for directing the heated air into the drying chamber, and an air extractor at the other end of said drying chamber, substantially as described.

In testimony whereof I affix my signature, in presence of two subscribing witnesses.

ROBERT GWYNNE FURLEY.

Witnesses:
T. A. F. SMEAD,
CAROLINE BURT.